O. C. WYSONG.
DOVETAILING MACHINE.
APPLICATION FILED FEB. 23, 1911.

1,121,706.

Patented Dec. 22, 1914.
6 SHEETS—SHEET 1.

Witnesses
E. M. McCallister
W. Thornton Bogert

Inventor
Olmedo Cortez Wysong
By C. W. Miles
Attorney

O. C. WYSONG.
DOVETAILING MACHINE.
APPLICATION FILED FEB. 23, 1911.

1,121,706.

Patented Dec. 22, 1914.
6 SHEETS—SHEET 4.

Witnesses
E. M. McCallister
W. Thornton Bogert

Inventor
Olmedo Cortez Wysong
By C. W. Miles
Attorney

UNITED STATES PATENT OFFICE.

OLMEDO CORTEZ WYSONG, OF GREENSBORO, NORTH CAROLINA.

DOVETAILING-MACHINE.

1,121,706.  Specification of Letters Patent.  Patented Dec. 22, 1914.

Application filed February 23, 1911. Serial No. 610,205.

*To all whom it may concern:*

Be it known that I, OLMEDO CORTEZ WYSONG, a citizen of the United States, residing at Greensboro, in the county of Guilford and State of North Carolina, have invented certain new and useful Improvements in Dovetailing-Machines, of which the following is a specification.

My invention relates to improvements in dovetailing machines.

One of its objects is to provide a machine in which the spindles may be belt driven and at higher speeds.

Another object is to provide for cutting part of the grooves as the work passes across the bits in one direction and another set of grooves as the work returns across the bits, or by duplicate application of the work to the bits, thereby permitting the use of larger and stronger spindles and larger driving pulleys.

Another object is to provide means to rough-cut the work before it is acted upon by the finishing bits, whereby the finishing bits are relieved from excessive work and strain, the work from being splintered, and heating of the bits is avoided.

Another object is to provide means to trim, cut or surface the ends of the work either simultaneously with or as a part of the general operation of cutting the dovetailing grooves to insure the ends being smooth and true relative to the grooves to facilitate accurate joints with work members grooved in counterpart.

Another object is to provide means whereby the relative position of the bits or cutters, and work is automatically shifted.

Another object is to provide improved automatic belt shifting and work feeding mechanism.

Another object is to provide improved spindle supporting and adjusting mechanism.

Another object is to provide means whereby the relative position of the rough-cut tools and work is automatically shifted.

Another object is to provide means to hold and feed the work, both irregular and plain work.

My invention further consists in certain details of form, combination and arrangement, all of which will be more fully set forth in the description of the accompanying drawings, in which:

*The work supporting members.*—The accompanying drawings represent the preferred embodiments of my invention.

Figures 1, 2, 3:
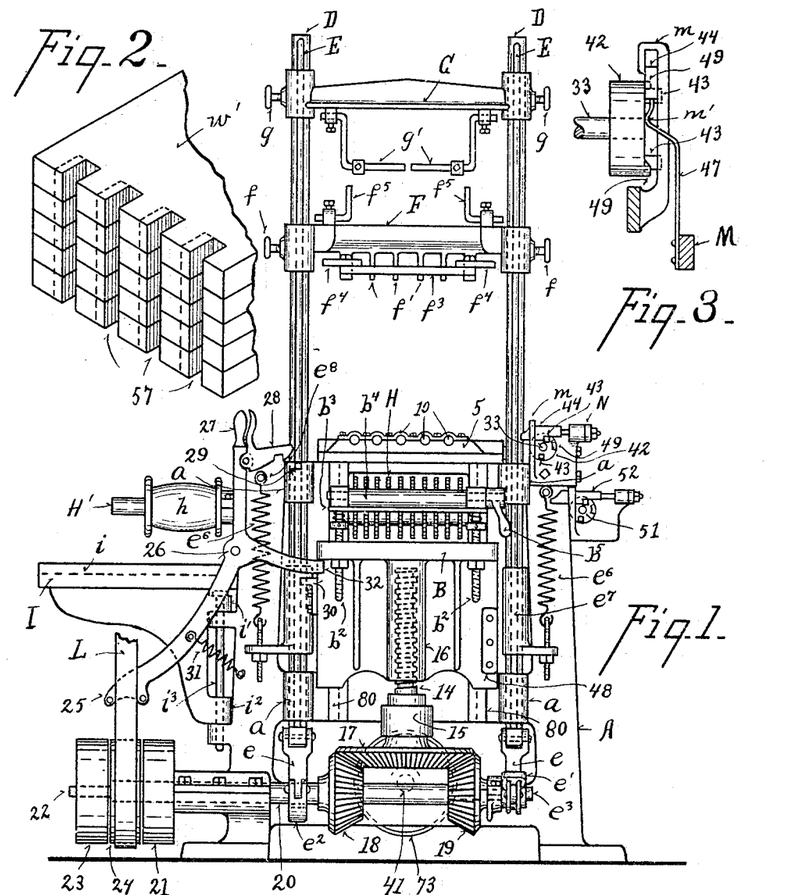
Figure 1 is a front elevation of my improved mechanism.
Fig. 2 is a detail perspective view of one class of work.
Fig. 3 is a detail partly in section of part of the tool shifting mechanism.

A represents the frame of the machine to the front of which is secured a vertically movable work table B, which is adapted to support flat work such as the sides, ends and bottoms of furniture drawers or other similar parts to be dovetailed. The table B is provided with adjustable guides $b$ $b'$ to aline the work sidewise, and a clamping mechanism comprising uprights $b^2$ adjustable relative to the table and provided with a vertically movable cross bar $b^3$ and an eccentric roller $b^4$ journaled in the heads of the uprights $b^2$, which eccentric when actuated by hand lever $b^5$ serves to clamp a number of pieces of flat work $w$ in position to be acted upon at one operation in the manner indicated in Figs. 2 and 5.

A guide $b^7$ against which the ends of the work $w$ are adapted to be alined is carried by frame A.

Figures 16, 17, 18, 19, 20:
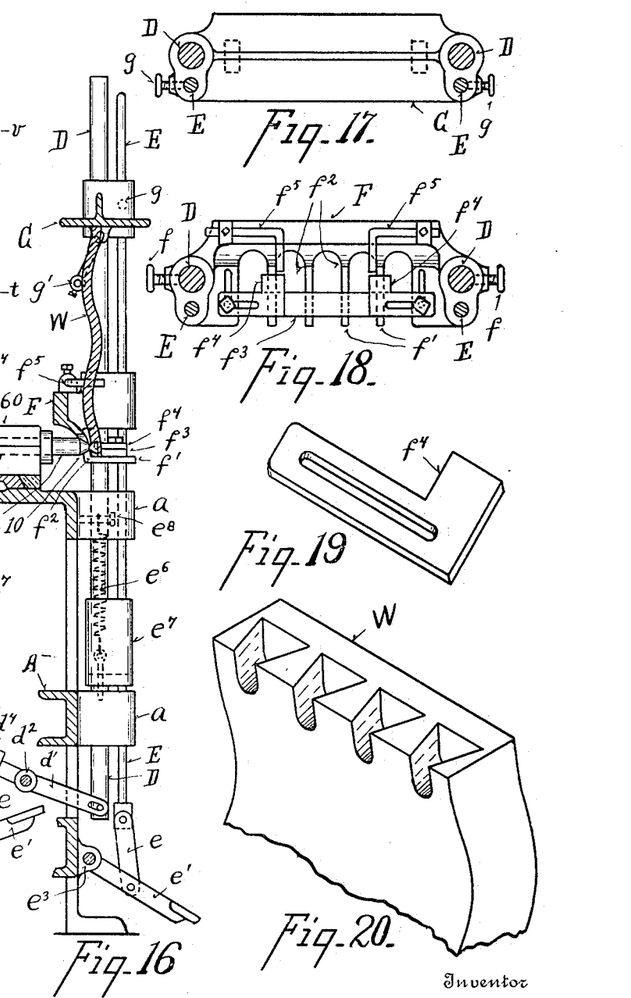
Fig. 16 is a similar view illustrating the work in contact with the bits.
Fig. 17 is a sectional detail on line $v$ $v$ of Fig. 15.
Fig. 18 is a sectional detail taken on line $t$ $t$ of Fig. 15 and with the work removed.
Fig. 19 is a perspective view of one of the work guides.
Fig. 20 is a perspective view of another class of work.

In order to support drawer fronts either straight or of irregular outline, or other work to be treated endwise as indicated in Fig. 20, I provide vertical rods or bars D E which are adapted to slide vertically in bearings $a$ carried by the frame A. The lower ends of bars D are connected by pins $d$ to crank arms $d'$ of a rock-shaft $d^2$ journaled to the frame A. An arm $d^3$ projecting from shaft $d^2$ is provided with an adjustable weight $d^4$ which serves to hold the rods D normally in an elevated position. The rods E are attached by means of links $e$ pivotally connected respectively to treadle $e'$ and a crank arm $e^2$ carried by a rock-shaft $e^3$ journaled to frame A. The rods E are normally held in an elevated position by means of springs $e^6$ attached at one end to collars $e^7$ locked to said rods E, and at the opposite ends to studs $e^8$ projecting from frame A.

A cross-bar F, or support for the lower end of the work is adjustably secured to the rods D by means of set screws $f$ and a cross-bar G or support for the upper end of the work, is adjustably secured by set screws $g$ to the rods E. The cross-bar F has a series of fingers $f'$ curving downwardly and thence projecting horizontally, with shoulders $f^2$ at the intersection of the curved and horizontal sections. The end of the drawer front or other work W to be treated rests upon the horizontal sections with one edge alined against the shoulders $f^2$, while the spaces between the respective fingers are sufficient for the dovetailing bits to pass and cut two dovetail grooves to each space. An adjustable cross-bar $f^3$ is adapted to be adjusted to aline with and guide the opposite edge of the work, and adjustable angle plates $f^4$ are adapted to act as edge guides or spacing bars to enable a series of pieces of work to be cut in duplicate. The curved sections of the fingers $f'$ serve to hold the work away from the main bar F to permit swell front or irregular or curved work to be treated. Additional adjustable edge guides or spacing bars $f^5$ are provided to prevent displacement of the work. The cross-bar G has adjustable edge and face guides or spacing bars $g'$ to guide the upper end of the work to the desired position.

The cross-bars F G are adapted to be adjusted to the upper portion of the rods D E when not in use, to provide room for the movements of the work table B. When in use the bar F is adjusted to a position slightly above the cutters or bits and the cross bar G to a position above the bar F slightly greater than the length of the work to be treated. Upon depressing the treadle $e'$ the bar G which is slightly out of contact with the upper end of the work W descends upon and grips the work firmly between the two cross bars F G and a further depression of the treadle causes both cross bars to descend bringing the work in contact with the dovetailing bits, the bar F carrying with it the rods D which rock the shaft $d^2$ and lift the weight $d^4$, and when the treadle is released the weight restores rods D and bar F to their elevated position while the springs $e^6$ restore the treadle, rods E and bar G to elevated position. The rock shafts $d^2$ $e^3$ through their connections with the rods D E insure uniform movement of the respective rods D E and uniform horizontal position for the cross bars F G.

Figure 10:
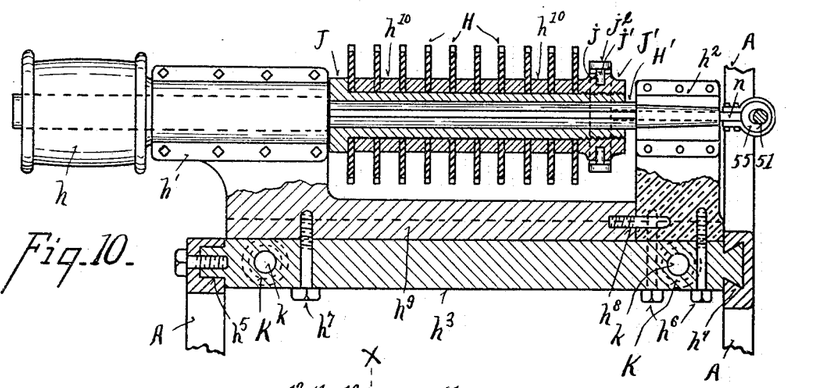
Fig. 10 is a detail partly in section of the rough-cut tools and their supporting, adjusting and shifting mechanism.
Figure 11:
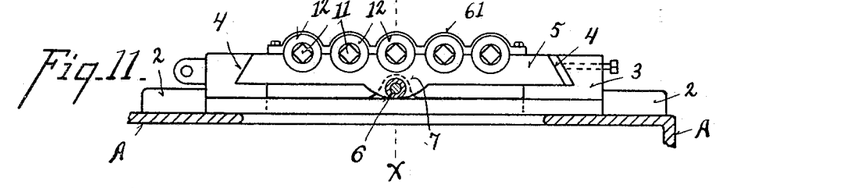
Fig. 11 is a detail partly in section and illustrating the spindles and their supporting and adjusting mechanism in rear end elevation.

*The preliminary cutters.*—Work $w$ clamped upon the table is adapted to be first acted upon by a series of rough-cut instruments, preferably a series of saws or cutter heads H mounted and suitably spaced upon a shaft H' adapted to be driven by means of a belt pulley $h$. For convenience in obtaining access to the tools H the shaft H' is preferably mounted in a movable bearing $h'$ near the pulley $h$ and a rigid bearing $h^2$ at its opposite end, said bearings being preferably secured by dovetailed joints $h^9$ to a cross frame $h^3$ sliding in horizontal guides or ways $h^4$ $h^5$ on the frame A. The bearing $h^2$ is rigidly secured to the cross frame $h^3$ by bolts $h^6$, while the bearing $h'$ is secured to the cross frame while in operation by a bolt $h^7$, but when said bolt is removed is adapted to slide endwise out of engagement with the dovetail groove $h^9$ and onto a pivotally supported shelf or bracket I having a corresponding dovetailed groove $i$ to receive and hold the bearing $h'$ and shaft H' in position where access may be had to the tools H. The bracket I is pivoted to the frame A by means of ears $i'$ $i^2$ and a pin $i^3$, and may be detached or swung around against the side of frame A or into position to receive or replace the bearing $h'$ upon the cross frame $h^3$ as desired. The bearing $h'$ has a dowel pin $h^8$ which assists to center it with the bearing $h^2$.

The several saws or tools H are preferably mounted upon a sleeve J which is splined upon and movable endwise to a limited extent upon shaft H′, said tools H being separated by spacing collars $h^{10}$ and locked upon said sleeve by a nut or threaded collar J′, while an annular groove $j$ is adapted to be engaged by rollers or studs $j'$ of a forked arm $j^2$ to shift said sleeve endwise upon shaft H′.

Sleeves K project rearwardly from the cross frame $h^3$ and at their free ends are seated in bearings $k'$ in the rear end of frame A. Sleeves K are internally threaded to engage threaded feed rods $k$ journaled in bearings $k'$ at the rear end of frame A. Outside frame A rods $k$ are provided with sprocket wheels $k^2$ which are connected together so as to move in unison by a sprocket chain $k^3$. A hand wheel $k^4$ on one of the rods $k$ serves to adjust both rods $k$ and thus to feed the cross frame $h^3$ carrying with it the shaft H′ and tools H either to or from the work table B, to vary the depth of cut, and to aline the journal of shaft H′ with the bracket I when it is desired to remove the tools H.

*The finish cutters.*—Mounted in guides 2 on the top of frame A is a horizontally adjustable frame 3 adapted to move from side to side across the table. Mounted in guides 4 on the frame 3 is a frame 5 movable endwise relative to frame A and adjustable by means of a screw rod 6 journaled to frame 5 and threaded to a projection 7 of frame 3, and adjustable by means of a knurl 8. Journaled to the frame 5 are a series of spindles 9 armed with dovetailing bits or tools 10, which are individually adjustable endwise by means of bolts 11 threaded into the ends of the spindle bearings and adapted to be locked to adjusted position by collars 12 adapted to act as lock nuts. The bits 10 are adapted to be adjusted into alinement vertically above the saws H so that as the work table ascends the saws make the first or rough cuts in the work as indicated in full line in Fig. 2, while the bits 10 being of tapered or conical outline further cut the grooves in the work to the tapered or dovetailed outline indicated in Fig. 5, which relieves the cutters 10 from excessive heat and work, permits cuts through several thicknesses of work at one operation, and provides for the escape of the cuttings, and prevents breaking off of the corners of the work or splintering of the work, particularly on the side where the bits emerge from the cuts, which would otherwise be liable to occur.

In order to provide spindles of ample diameter, and space between the spindles for pulleys by means of which the spindles may be belt driven and at the high speed requisite for satisfactory work, the spindles are spaced on frame 5 so that the number of bits 10 employed is only half that of the saws H, and with the bits primarily spaced vertically above alternate saws. I further provide after the work on the table has been elevated to clear the bits 10, and the bits 10 have made their cut through alternate saw cuts, that frame 3 carrying the frame 5 and bits 10 shall automatically move laterally a distance equal to the space between centers of the saw cuts, so as to bring the bits 10 into vertical alinement beneath the balance of the saw cuts, whereupon the work table is fed downwardly to make the finish cut of the bits 10 through said alternate saw cuts.

*The work table feed.*—The work table B is fed vertically forward and backward on ways 80 by means of a screw rod 14 journaled to frame A at 15 and threaded into a nut 16 on the table B. The lower end of screw rod 14 is provided with a beveled gear 17, which is continually in mesh with a pair of beveled gears 18 19. The gear 18 is rigidly mounted upon a sleeve or tubular shaft 20, to the opposite end of which is rigidly connected a belt pulley 21. The gear 19 is rigidly mounted upon a shaft 22 concentrically journaled within the sleeve 20, and having rigidly secured at its opposite end a belt pulley 23. A pulley 24 is loosely mounted upon the sleeve 20 between the pulleys 21 and 23. A belt L is adapted to engage any one of the pulleys 21, 23, 24, and a belt shifter 25 to shift said belt from one pulley to the other. Said belt shifter is pivoted at 26 to the frame A, and has a hand lever 27 provided with a spring actuated latch bar 28 adapted to engage a stud 29 projecting from frame A to lock the belt shifter with the belt in engagement with pulley 23, which serves to elevate table B. As table B reaches the desired maximum elevation, an adjustable trip 30 carried by table B is adapted to release the latch bar 28 from the stud 29, whereupon spring 31 pulls the belt shifter over and shifts the belt to pulley 21, which automatically reverses the table feed. The downward table feed continues until the table contacts with arm 32 of the belt shifter and thereby shifts the belt to the loose pulley 24 and automatically stops the table feed.

*The lateral spindle feed.*—When the table B reaches its maximum elevation the spindles 9 are automatically shifted laterally preferably as follows: A shaft 33 is journaled to the frame A and provided at one end with a friction clutch member 34 tight on shaft 33. A friction clutch member 35 is loosely journaled on shaft 33 and the two clutch members held yieldingly in engagement by means of a spring 36 the tension of which is adjustably regulated by nuts 37. The clutch member 35 is provided with a belt pulley 38 and driven by a belt 39 from a pulley 40 on shaft 41. At the opposite end shaft 33 is provided with a cylindrical head 42 which is provided with rectangular projections or dogs 43 which are adapted to be engaged by a latch bar 44 to alternately stop and start the rotation of shaft 33. The shaft 33 is connected to frame 3 carrying the spindles 9 by means of an eccentric 45 and an eccentric rod 46. The eccentric 45 is preferably adjustable as to its degree of eccentricity with reference to shaft 33, and the eccentric rod adjustable as to length, whereby the extent to which frame 3 is shifted laterally may be varied. A trip 47 carried by a bracket M attached at 48 to the table B is adapted as table B reaches its maximum elevation to lift the latch bar 44, which is guided by a keeper $m$, and to release said latch bar from the stud 43 with which it is engaged, whereupon the shaft 33 commences to revolve bringing a projection 49 on the face of the head 42 into engagement with the part $m'$ of the trip 47, thereby throwing the trip 47 out of engagement with the latch bar 44 and allowing the latch bar to assume a position to catch the opposite projection 43 and stop the rotation of shaft 33. N represents a rubber buffer to receive the shock of the engagement of the projections 43 with the latch bar 44. Thus shaft 33 makes a half revolution each time the latch bar 44 is tripped and thus alternately shifts the frame 3 and bits 10 laterally with reference to the frame A and table B. A similar tripping mechanism 50 is adjustably connected to a collar or bracket P adjustably connected to the rod D and adapted to be adjusted to position to engage and trip the latch bar when the table B is out of use and the cross bars F, G, are employed to treat work W of the character illustrated in Fig. 20.

*The lateral adjustment of the rough-cut tools.*—A shaft 51 and mechanism the duplicate of that heretofore described as carried by shaft 33 is provided with a latch 52 and driven by a belt 53 from a pulley 54 on the shaft 41. An eccentric 55 on shaft 51 is provided with an eccentric rod $n$ connected at its opposite end to a sleeve $n'$ threaded to the shank of the forked lever $j^2$ which serves to shift the sleeve J carrying the saws H endwise on the shaft H'. The eccentric 55 is adjustable to vary its eccentricity relative to shaft 51, and the sleeve $n'$ is also adjustable to and from the center $n^2$ by means of which the lever $j^2$ is pivotally connected to frame A. By adjusting the eccentric 55 or the sleeve $n'$ on the lever $j^2$ the extent to which the saws will be shifted endwise on shaft H' may be varied as desired. A trip 56 carried by bracket M serves to trip the latch 52 to shift the saws as heretofore described for the trip 47. Where it is desired to match the work together with rectangular tongues and grooves as indicated in Fig. 14 the lateral adjustment of the saws permits the use of the tools 10 to be dispensed with, and by employing the lateral adjustment of the saws the saws cut the grooves 57 as illustrated in full line Fig. 2 at the upward movement of the table B, and after the saws have cleared the work and have been shifted laterally, serve to cut away a further portion of material indicated in dotted line Fig. 2, at the downward movement of the table, thus permitting grooves of varying width and depth to be cut, with comparatively narrow saws, and also permitting both styles of work indicated in Figs. 13 and 14 to be done without change in the cutters H as ordinarily employed in connection with the tools 10.

*The spindle driving mechanism.*—The respective spindles 9 are mounted in bearings 60, 61 on the frame 5, and are provided with belt pulleys 62, 63, which on alternate spindles are separately alined to provide for space in which to employ pulleys of ample diameter. A belt 64 serves to drive two of the spindles by means of pulleys 62, being also strained over a pulley 65 on driving shaft 41 and over idler pulley 66 carried by a stationary frame 67 attached to frame A, and also over idler pulley 68 carried by a movable frame 70 which is hinged at one end at 71 to frame 67 and free at its opposite end, and by its weight serves to tension the belt 64 and to provide for the movements of the spindle carrying frame 3. A belt 72 serves to drive three spindles by means of pulleys 63, being also strained over pulley 73 on shaft 41, idler 74 on frame 67 and idler 75 on movable frame 70 which also serves to tension belt 72. A tight pulley 77 and loose pulley 78 on the rear end of shaft 41 serve to drive shaft 41 by means of a belt from a countershaft.

Figures 4, 5:
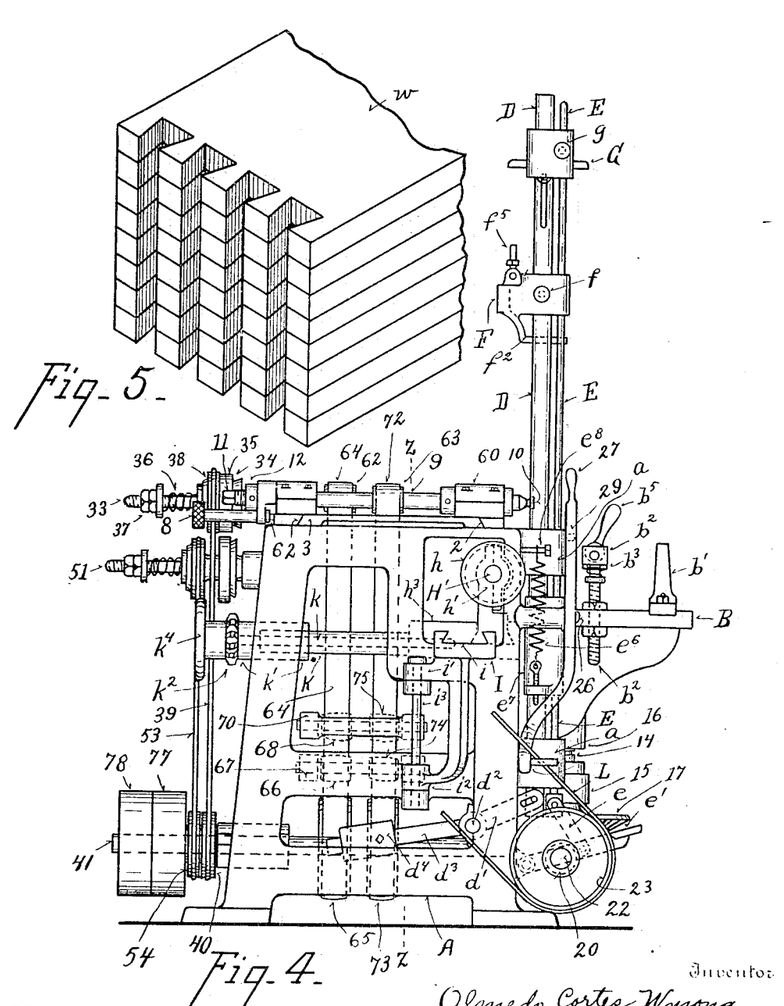
Fig. 4 is a side elevation of the mechanism illustrated in Fig. 1.
Fig. 5 is a detail perspective view of another class or stage of the work.
Figures 6, 7, 8, 9:
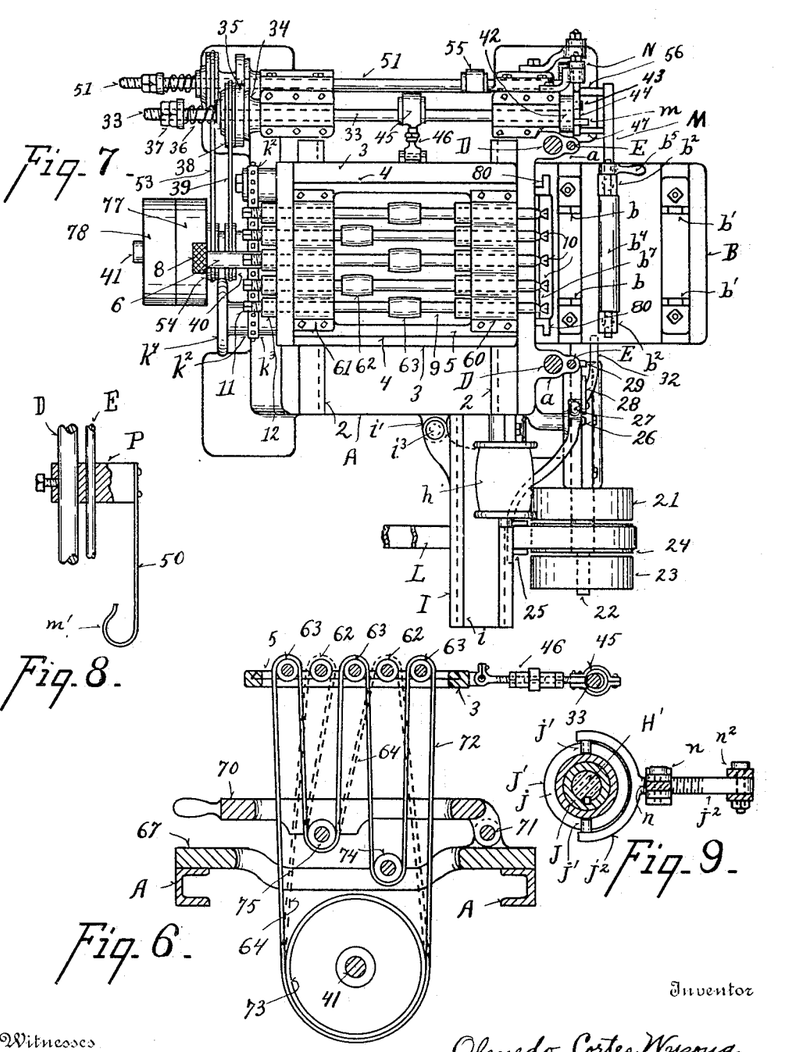
Fig. 6 is a sectional detail on line $z$ $z$ of Fig. 4 illustrating the spindle driving mechanism.
Fig. 7 is a top plan view of the mechanism illustrated in Fig. 1.
Fig. 8 is a detail of one of the tool shifter tripping mechanisms.
Fig. 9 is a detail partly in section of the rough-cut tool shifting mechanism.
Figures 12, 13, 14:
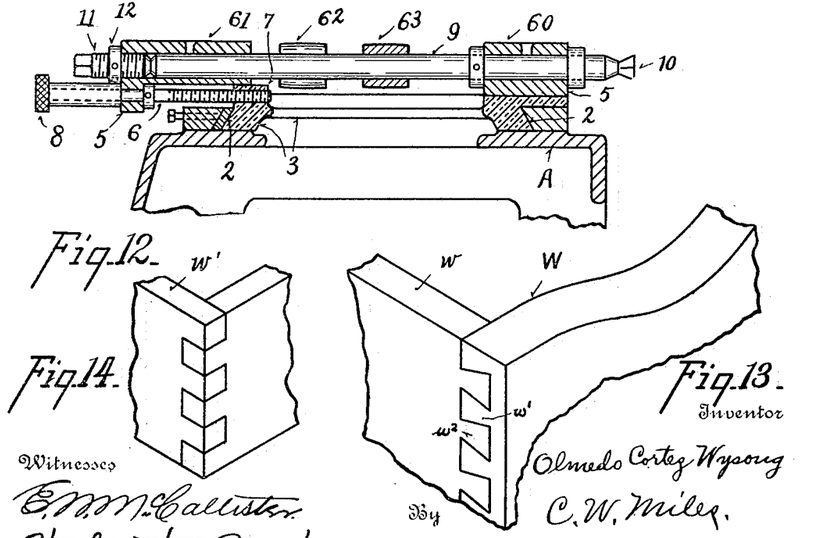
Fig. 12 is a sectional detail through the spindle supporting and adjusting mechanism on line $x$ $x$ of Fig. 11.
Fig. 13 is a perspective view of one class of completed work.
Fig. 14 is a perspective view of another class of completed work.
Figure 15:
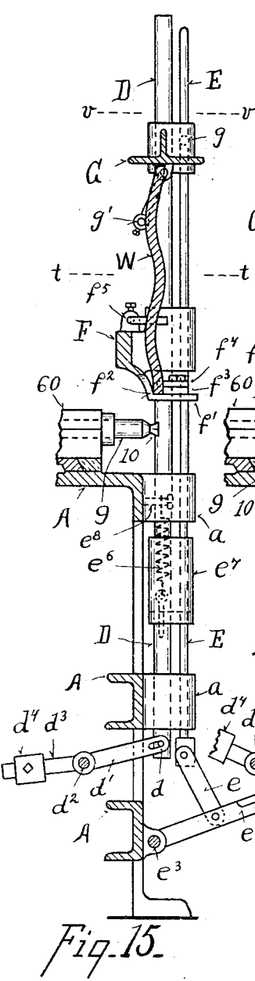
Fig. 15 is a vertical sectional detail of the mechanism employed to feed the class of work W illustrated in Fig. 20, with the mechanism in the initial position.

*The end trimming mechanism.*—In fitting the tongues $w^2$ of the work $w$ into the grooves W' of the work W, see Fig. 13, it is desirable to have an accurate fit not only at the sides but also at the ends of the tongues, and work which has been defectively surfaced across the ends before being placed on table B, or which is not accurately alined with the plate $b^7$ is liable not to fit at the ends of the tongues $w^2$ with the grooves of work W. I have discovered that by trimming or surfacing the ends of the work $w$ in one operation with the formation of the grooves in the work $w$, I am enabled to secure a uniform fit of great accuracy at the ends of the tongues $w^2$, and also superior work of the character indicated in Fig. 14, and also where counterpart pieces of work such as illustrated in Fig. 5 are matched together.

Figures 21, 22, 23, 24, 25:
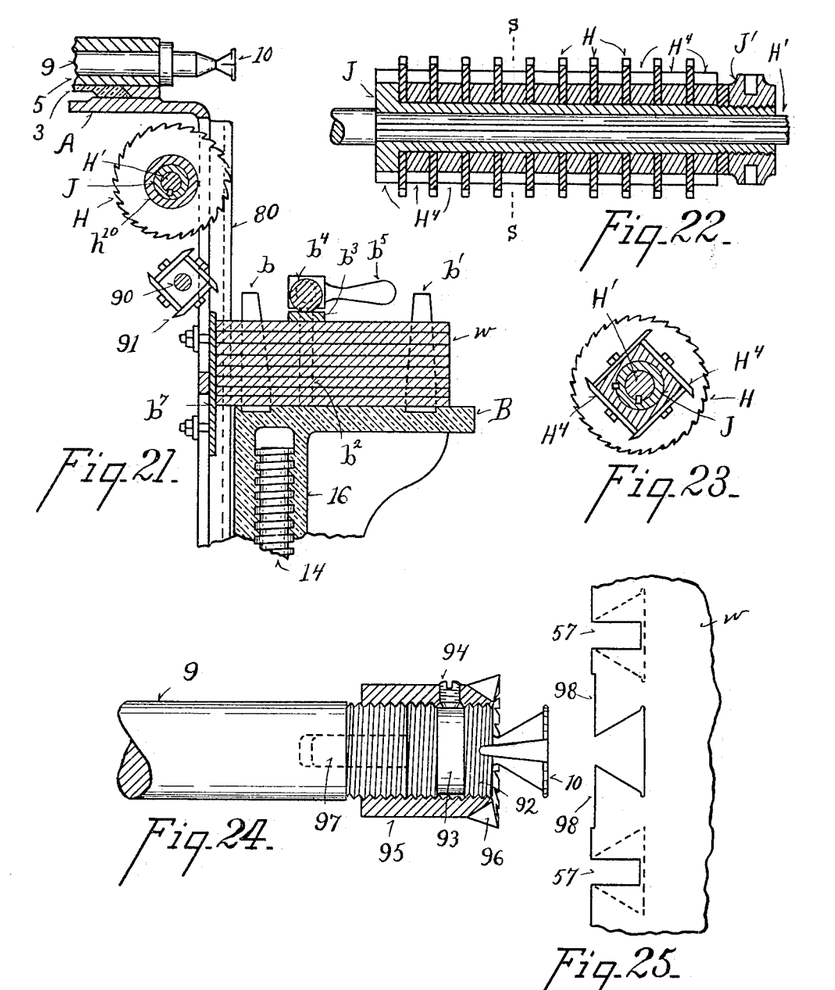
Fig. 21 is a central vertical sectional view through the work table and cutters, and illustrating one form of mechanism by which the ends of the work are adapted to be trimmed or surfaced in one operation with the cutting of the grooves.
Fig. 22 is a view similar to Fig. 10 and illustrating a modification adapted to trim or surface the ends of the work as well as to cut the rough or preliminary grooves.
Fig. 23 is a section on line $s$ $s$ of Fig. 22 but showing the end surfacing cutters in side elevation.
Fig. 24 is an enlarged detail partly in section of one of the finish cutters and illustrating a modification adapted to trim or surface the ends of the work simultaneously with the finish cut in the grooves.
Fig. 25 is a plan view of a partially completed piece of work illustrating the operation of the cutter Fig. 24.

As illustrated in Fig. 21 I provide in addition to the preliminary grooving cutters H and the finish cutters 10, an independent shaft 90 carrying a series of cutters 91 which after the work has been alined against guide $b^7$ and clamped to table B are adapted as table B is fed toward the cutters H, 10, to make a trimming or surfacing cut across the end of the work $w$ to bring it to true and accurate dimensions with reference to the cuts made by cutters H or 10 to insure an accurate fit with the parts with which it is intended to interlock.

As illustrated in Figs. 22 and 23, a series of trimming cutters $H^4$ are arranged at opposite sides of the respective cutters H upon the sleeve J and serve to trim or surface the ends of the work at the same time that the cutters H make the preliminary grooves in the work.

As illustrated in Fig. 24 each cutter 10 is formed integral with a threaded body member 92 from which a portion of the threads are turned away at 93. The member 92 carries a dowel or stem 97 seating in a corresponding bore or recess in the end of the spindle 9 to assist in holding the cutter 10 in axial alinement with the spindle 9. The forward end of the spindle 9 is threaded and an internally threaded sleeve 95 engages the threads on member 92 and on spindle 9 and serves to lock said member 92 firmly to the spindle. A set screw 94 engaging the face 93 of member 92 serves to prevent the members becoming loose or disconnected. The forward end of sleeve 95 is provided with teeth or cutters 96 which serve to trim or surface the ends of the work simultaneously with the finish cut in the grooves as indicated in Fig. 25, where 98 indicates the trimmed portion of the end of the work. As the cutters 10 are shifted transversely to make the finish cuts through the alternate set of grooves 57, the cuts 98 made by the cutters 96 overlap with their previous cuts thus producing a uniform cut entirely across the end of the work.

It is within the contemplation and scope of my invention to attain the relative lateral movement between the work and cutters by the movement either of the cutters or the work.

The mechanism herein illustrated and described is capable of considerable modification without departing from the principle of my invention.

Having described my invention, what I claim is:

1. A dovetailing machine comprising a reciprocating work holder, a series of cutters projecting into the path of the work when carried by said work holder, said cutters being arranged in a zone transversely to the path of travel of the work, and means to change the relative position of the work and cutters in a direction substantially parallel to said zone between respective engagements of the work and cutters.

2. A dovetailing machine comprising a plurality of rotary cutters projecting into and arranged across the path of travel of the work so as to make independent cuts in the work, a work holder adapted to feed the work forward and backward across said cutters, and means to alter the relative position of the cutters and work during the interval between the disengagement of the work from said cutters on its forward movement and its engagement with the cutters on its reverse movement, to enable said respective cutters to form one recess in the work at the forward feed of the work and another recess in the work at the reverse feed of the work.

3. In a mechanism of the character described, a work holder adapted to travel in a forward and reverse direction, means to clamp work to said holder, a plurality of rotary cutters adapted to engage the work on both the forward and reverse movement of the work holder, means to alter the relative position of said work holder and cutters during the interval between the disengagement of the work from said cutters on its forward movement and its engagement with said cutters on its reverse movement to enable said cutters to form separate series of recesses in the work at forward and reverse movements of the work.

4. A dovetailing machine comprising a plurality of power driven rotary cutters projecting into and arranged across the path of travel of the work, a work holder adapted to be fed in forward and reverse direction across said cutters and provided with guides adapted to hold successive pieces of work to a uniform position relative to said holder, and means to alter the relative position of said work holder and cutters during the interval between the disengagement of the work from said cutters on its forward movement and its engagement with said cutters on its reverse movement to enable said respective cutters to form separate recesses in the work at forward and reverse movements of said work holder.

5. In a mechanism of the character described, a plurality of power driven rotary cutters, a work holder adapted to be fed in forward and reverse direction across said cutters, said work holder being provided with mechanism to hold successive pieces of work to a uniform position relative to said holder, and mechanism to automatically alter the relative position of said work holder and cutters during the interval between the disengagement of the work from said cutters on its forward movement and its engagement with said cutters on its reverse movement to enable said cutters to form separate series of recesses in the work at forward and reverse movements of said work holder.

6. A dovetailing machine comprising a plurality of rotary cutters projecting into and arranged across the path of travel of the work, a reciprocating work holder, means to reciprocate the work holder to bring the work into engagement with said cutters, and mechanism to change the relative position of said work holder and cutters transversely to the work feed to cause said respective cutters to cut separate recesses in the work at separate engagements of the work with said cutters.

7. A dovetailing machine comprising a plurality of rotary cutters disposed across and movable transversely relative to the work feed, a reciprocating work holder adapted to be fed forward and backward across said cutters, means to lock the work to position relative to said holder, and means to shift said cutters transversely relative to the work feed during the interval between the disengagement of the work from said cutters when feeding in one direction and its engagement with the cutters when feeding in the reverse direction.

8. A dovetailing machine comprising a plurality of rotary cutters arranged across and projecting into the path of travel of the work, a power driven work holder having guides adapted to hold successive pieces of work to a uniform position relative to said holder, mechanism to reciprocate said work holder forward and backward across said cutters, means to lock the work to position relative to said holder, and mechanism to alter the relative position of said work holder and cutters during the interval between the disengagement of the work from said cutters when feeding in one direction and its engagement with said cutters when feeding in the reverse direction.

9. In a mechanism of the character described, a plurality of rotary cutters movable transversely relative to the work feed, a power driven work holder, means to lock the work to position relative to said work holder, mechanism to reciprocate said work holder forward and backward across said cutters, and mechanism to shift said cutters transversely relative to the work feed during the interval between the disengagement of the work from said cutters when feeding in one direction and its engagement with said cutters when feeding in the reverse direction.

10. In a mechanism of the character described, a plurality of rotary cutters adapted to make a preliminary cut in the work, a plurality of rotary finish cutters adapted to follow in the cuts made by said preliminary cutters to make a finish cut in the work, a reciprocating work holder, means to lock the work to position relative to said work holder, and means to alter the relative position of said work holder and finish cutters during the interval between the disengagement of said finish cutters from the work when feeding in one direction and the engagement of the work with said cutters when feeding in the reverse direction.

11. A dovetailing machine comprising a plurality of rotary cutters disposed across and projecting into the path of travel of the work and adapted to make preliminary cuts in the work, a plurality of cutters adapted to make finish cuts through the cuts made by said preliminary cutters, and a reciprocating work holder adapted to feed the work forward and backward across said respective cutters.

12. In a mechanism of the character described, a plurality of rotary cutters adapted to make a preliminary cut in the work, a plurality of rotary cutters adapted to make a finish cut in the work through the cuts made by said preliminary cutters, and a reciprocating work holder adapted to be fed forward and backward across said cutters, said work holder being provided with means to clamp the work so as to present the end of the work to said respective cutters.

13. In a mechanism of the character described, a plurality of rotary cutters adapted to make a preliminary cut in the work, a plurality of rotary cutters adapted to make a finish cut in the work through the cuts made by said preliminary cutters, and an automatically controlled reciprocating work holder adapted to feed the work forward and backward across said preliminary and finish cutters.

14. A dovetailing machine comprising a plurality of rotary cutters arranged across and projecting into the path of travel of the work and adapted to make preliminary cuts in the work, a plurality of conical rotary cutters adapted to make finish cuts in the work through the grooves made by said preliminary cutters, a reciprocating work holder provided with clamping means adapted to present the end of the work successively to said preliminary and finish cutters, and means to feed said work holder forward and backward across said respective cutters.

15. In a mechanism of the character described, a plurality of rotary grooving cutters adapted to make a preliminary cut in the work, a plurality of conical rotary cutters adapted to make a finish cut in the work through the grooves made by said grooving cutters, a reciprocating work holder adapted to feed the work forward and backward across said grooving and conical cutters and means to alter the relative position of said work holder and conical cutters during the interval between the disengagement of the work from said conical cutters when feeding in one direction and its engagement with said cutters when feeding in the reverse direction.

16. In a mechanism of the character described, a plurality of rotary spindles respectively armed with dovetailing cutters, a frame movable in the direction of the axes of said spindles and to which said spindles are journaled, a frame movable transversely of the spindle axes and on which said spindle carrying frame is mounted, means to drive said respective spindles, a work holder adapted to feed the work forward and backward across said cutters and mechanism to shift said spindles transversely of their axes during the interval between the disengagement of said work from said cutters and the reëngagement of the work with said cutters.

17. In a mechanism of the character described, a plurality of rotary spindles respectively armed with dovetailing cutters, a frame movable in the direction of the axes of said spindles and to which said spindles are journaled, means to adjust said spindles individually in the direction of their axes relative to said frame, a member upon which said spindle carrying frame is mounted movable transversely of the spindle axes, means to drive said respective spindles, a work holder adapted to feed the work forward and backward across said cutters, and means to shift said spindles transversely of their axes during the interval between the disengagement of the work from said cutters and the reëngagement of the work with said cutters.

18. In a mechanism of the character described, a plurality of rotary spindles respectively armed with dovetailing cutters, a spindle carrying frame movable in the direction of the spindle axes and to which said spindles are journaled, a member upon which said spindle carrying frame is mounted movable transversely of the spindle axes, means to drive said respective spindles, a work holder adapted to feed the work into and out of engagement with said cutters, and mechanism to shift said transversely movable member during the interval between the disengagement of the work with said cutters and the reëngagement of the work with said cutters.

19. In a mechanism of the character described, a plurality of rotary spindles respectively armed with dovetailing cutters and provided with belt pulleys, a frame movable in the direction of the axes of said spindles, and to which said spindles are journaled, a member upon which said spindle carrying frame is mounted movable transversely of the spindle axes, a driving shaft provided with a belt pulley, a belt receiving motion from said driving belt pulley and adapted to drive said respective spindles, means to yieldingly tension said belt, a work holder adapted to feed the work into and out of engagement with said cutters, and mechanism to shift said transversely movable member during the interval between the disengagement of the work with said cutters and the reëngagement of the work with said cutters.

20. In a mechanism of the character described, a plurality of rotary spindles respectively armed with dovetailing cutters and provided with belt pulleys, alternate pulleys on said spindles being in separate alinement, a frame upon which said spindles are journaled movable transversely of the spindle axes, a driving shaft provided with a plurality of spindle driving belt pulleys, separate belts receiving motion from said respective driving belt pulleys and adapted to engage respective series of pulleys on said spindles, means to yieldingly tension said belts, a work holder adapted to feed the work into and out of engagement with said cutters, and mechanism to shift said spindle carrying frame transversely during the interval between the disengagement of the work from said cutters and the reëngagement of the work with said cutters.

21. In a mechanism of the character described, a plurality of rotary spindles respectively armed with dovetailing cutters, means to drive said respective spindles, a frame upon which said spindles are supported and journaled, said frame being movable transversely of the spindle axes, an intermittently rotating shaft, mechanism connecting said shaft to said frame and adapted to intermittently shift said frame transversely of the spindle axes, and a work holder adapted to feed the work into and out of engagement with said cutters.

22. In a mechanism of the character described, a plurality of rotary grooving cutters adapted to make a preliminary cut in the work, a plurality of conical rotary cutters adapted to make a finish cut through the cuts made by said grooving cutters, a reciprocating work holder adapted to feed the work forward and backward across both the preliminary and finish cutters, and mechanism to independently adjust said preliminary and finish cutters into and out of operative position with said work holder without disturbing the relative individual adjustment of said respective series of cutters.

23. In a mechanism of the character described, a plurality of rotary spindles respectively armed with dovetailing cutters, means to drive said spindles, a frame movable in the direction of the spindle axes and to which said spindles are journaled, a frame supporting said spindle carrying frame and movable transversely of the spindle axes, a shaft operatively connected to said transversely movable frame, a positively driven clutch member, a clutch member held yieldingly in engagement with said positively driven clutch member and adapted to rotate said shaft, a latch bar adapted to lock said shaft against rotation, a movable work holder and means movable in unison with said work holder to release said latch bar and permit said shaft to rotate.

24. A dovetailing machine comprising a plurality of rotary cutters projecting into and arranged across the path of travel of the work so as to make independent cuts in the work, a work holder to feed the work forward and backward across said cutters, means to alter the relative position of the cutters and work during the interval between the disengagement of the work from said cutters on its forward movement and its engagement with the cutters on its reverse movement to enable said respective cutters to form separate recesses in the work at the forward and reverse feeds of the work, and mechanism when manually released to automatically feed said work holder once forward and backward across said cutters and to stop said work holder in position to repeat its operation.

25. A dovetailing machine comprising a plurality of rotary cutters arranged across and projecting into the path of travel of the work, a reciprocating work holder adapted to reciprocate the work forward and backward across the path of said cutters, and to engage the work with said cutters on both forward and backward movement of said work holder, and means to alter the relative position of said cutters and work holder transversely during the interval between the disengagement of the work with said cutters and its reëngagement with said cutters, to present a new portion of the work to said cutters on both forward and backward movement of said work holder.

26. In a mechanism of the character described, a plurality of rotary spindles armed at one end with cutters adapted to cut dovetail grooves in the work, a reciprocating work holder adapted to carry the work into engagement with said cutters, mechanism to lock the work to said work holder, a plurality of rotary cutters carried by said spindles and adapted to surface the end of the work adjacent to said dovetail grooves, and means to intermittently shift said spindles transversely to the work feed thereby causing separate cuts of said end surfacing cutters to overlap each other.

27. A dovetailing machine comprising a plurality of rotary spindles, a plurality of conical cutters carried by said spindles, said cutters being arranged across the path of travel of the work so as to project into the path of travel of the work and adapted to cut dovetail grooves in the work, a work holder adapted to feed the work into engagement with said cutters, mechanism to lock the work to said work holder, a plurality of rotary cutters carried by said spindles and adapted to surface the ends of the work, and mechanism to intermittently alter the relative position of said cutters and work holder transversely to cause separate cuts of said end surfacing cutters to overlap each other.

28. In a mechanism of the character described, a plurality of rotary spindles armed with dovetailing cutters, a plurality of work holders substantially in a plane with but at opposite sides of said cutters, said respective work holders being adapted to hold work of different character from each other, each work holder having an idle position free from interference with the use of the opposite work holder, and each adapted to feed work into engagement with said cutters.

29. In a mechanism of the character described, a plurality of rotary spindles armed with dovetailing cutters, a pair of work holders located in substantially the same plane with said cutters and at opposite sides thereof and adapted to respectively present work from opposite sides to the action of said cutters, one of said work holders being adapted to present the work in position to cut tongues and grooves and the opposite work holder to present work in position to form blind mortises.

30. In a mechanism of the character described, a plurality of rotary spindles armed with dovetailing cutters, a pair of work holders located substantially in a plane with and at opposite sides of said cutters and adapted to be selectively employed to independently present work from opposite sides to the action of said cutters, one of said work holders being adapted to present the face of the work to said cutters and the opposite work holder being adapted to present the end of the work to said cutters.

31. In a mechanism of the character described, a plurality of rotary spindles armed with dovetailing cutters, a plurality of work holders at opposite sides of said cutters adapted to independently present work to said cutters, said work holders being adjustable to positions so as not to interfere with the operation of each other, and means operating in unison with the movements of said work holders adapted to shift said cutters transversely of the work holder feed.

32. A dovetailing machine comprising a plurality of grooving cutters arranged across and projecting into the path of travel of the work and adapted to make cuts with parallel walls in the work, a reciprocating work holder adapted to be fed forward and backward across said cutters, and mechanism to alter the relative position of said cutters and work holder transversely during the interval between the disengagement of the work from said cutters when feeding in one direction and its reëngagement with the work when feeding in the reverse direction.

33. A dovetailing machine comprising a plurality of grooving cutters arranged across and projecting into the path of travel of the work and adapted to make cuts with parallel walls in the work, a plurality of spindles armed with conical cutters adapted to make finish cuts through the grooves of said grooving cutters, a reciprocating work holder adapted to feed the work forward and backward across said respective cutters, and mechanism to alter the relative position of said conical cutters and the work holder transversely during the interval between the disengagement of the work from said cutters when feeding in one direction and its reëngagement with the work when feeding in the reverse direction.

34. In a mechanism of the character described, a plurality of grooving cutters mounted upon a common axis and adapted to cut grooves with parallel walls in the work, a plurality of spindles armed with conical cutters adapted to make finish cuts through the grooves cut by said grooving cutters, a reciprocating work holder adapted to feed the work forward and backward across said respective cutters, and mechanism to alter the relative position of said conical cutters and the work holder transversely during the interval between the disengagement of the work from said cutters when feeding in one direction and its reëngagement with the work when feeding in the reverse direction.

35. A dovetailing mechanism comprising a plurality of rotary grooving cutters to make a preliminary cut in the work, a plurality of conical rotary cutters to make a finish cut through the cuts made by said grooving cutters, a reciprocating work holder to feed the work forward and backward across both the grooving and finishing cutters, and mechanism to separately adjust said respective series of grooving and finishing cutters into and out of operative relation with said work holder without disturbing the individual adjustment of said cutters relative to said respective series.

In testimony whereof I have affixed my signature in presence of two witnesses.

OLMEDO CORTEZ WYSONG.

Witnesses:
E. C. WEISNER,
GUY BRANSON.

Copies of this patent may be obtained for five cents each, by addressing the "Commissioner of Patents, Washington, D. C."